June 22, 1937.  E. A. STALKER  2,084,463
PUMPING MACHINERY
Filed March 11, 1935   4 Sheets-Sheet 1
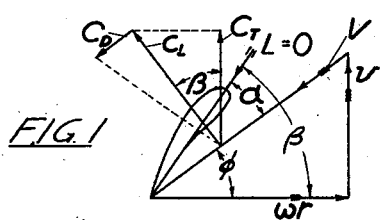
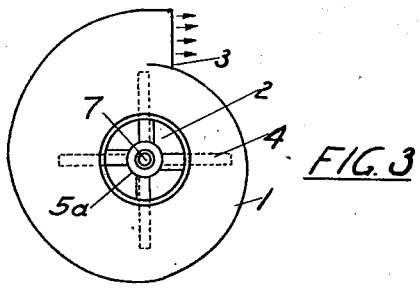
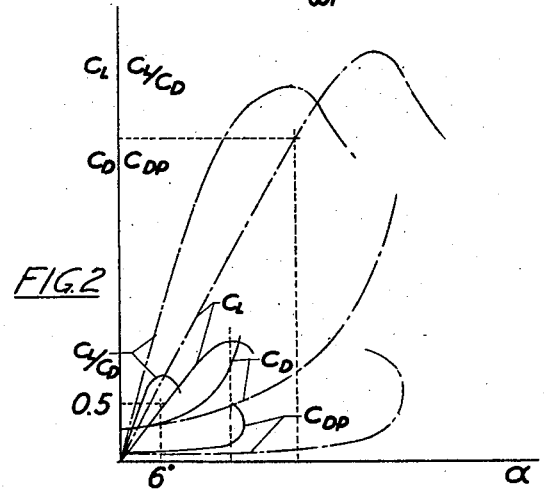
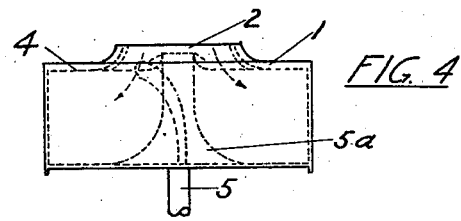
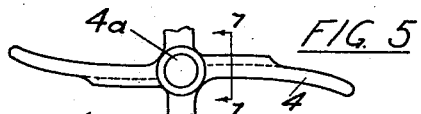
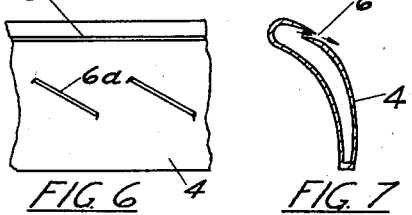
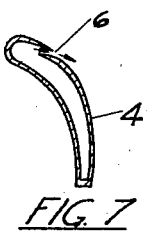
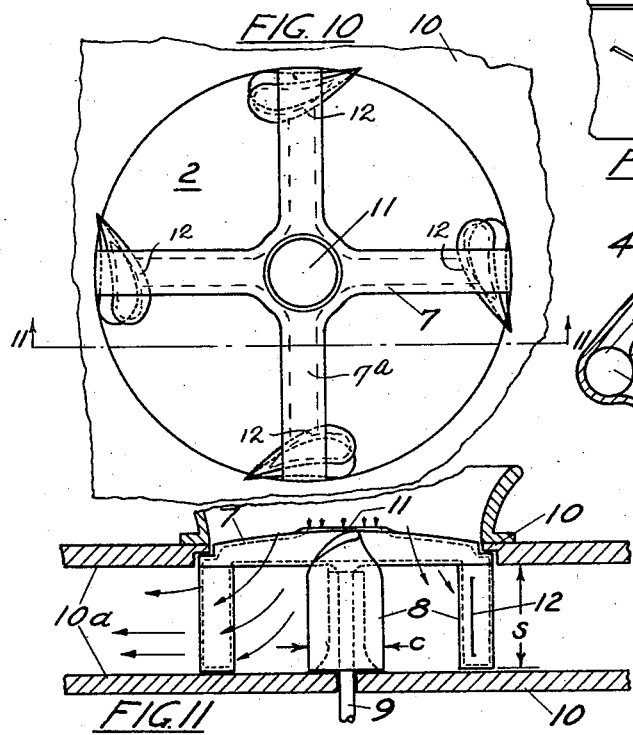
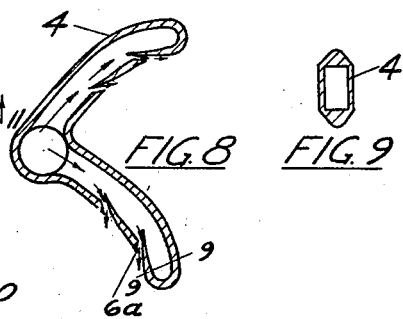
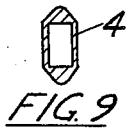
INVENTOR
Edward A. Stalker June 22, 1937.  E. A. STALKER  2,084,463
PUMPING MACHINERY
Filed March 11, 1935  4 Sheets-Sheet 2

INVENTOR
Edward A. Stalker

June 22, 1937. E. A. STALKER 2,084,463
PUMPING MACHINERY
Filed March 11, 1935 4 Sheets-Sheet 3
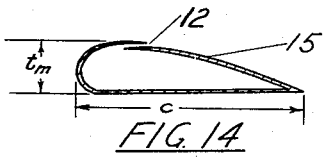
FIG. 14
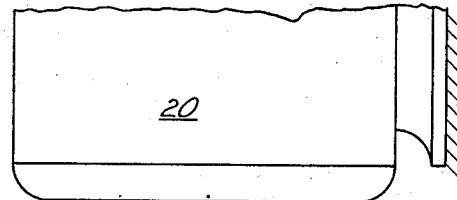
FIG. 12
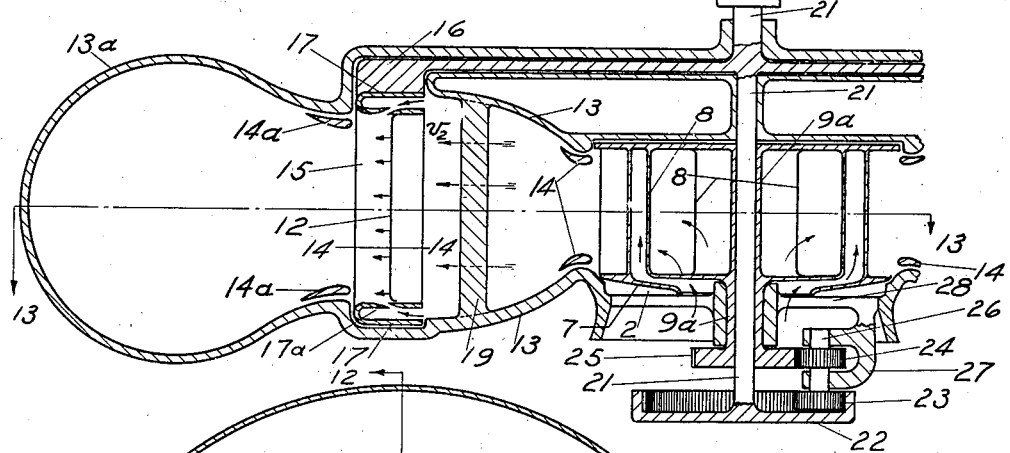
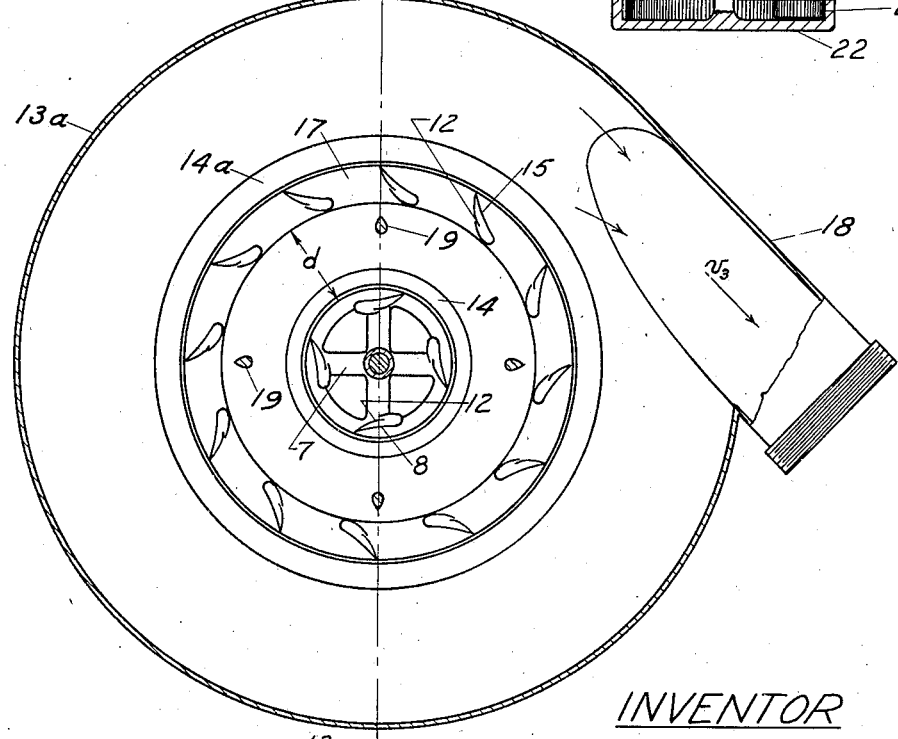
FIG. 13
INVENTOR
Edward A. Stalker June 22, 1937.  E. A. STALKER  2,084,463
PUMPING MACHINERY
Filed March 11, 1935  4 Sheets-Sheet 4

INVENTOR
Edward A. Stalker

Patented June 22, 1937

2,084,463

UNITED STATES PATENT OFFICE 2,084,463

PUMPING MACHINERY

Edward A. Stalker, Ann Arbor, Mich.

Application March 11, 1935, Serial No. 10,408

11 Claims. (Cl. 230—127)

My invention relates to pumping machinery and other fluid machines such as turbines, and the like, and in particular to the employment of means to energize the boundary layer on the surfaces bathed by the fluid flow. This application contains subject matter in common with my application Serial No. 674,342 filed June 5, 1933, in which division was required.

This application is concerned with fluid machines having a plurality of impeller means operating on the same fluid, one impeller means serving to energize the boundary layer on the surfaces of the other impeller means. It is also concerned with the combination of sets of blades forming a plurality of impellers of which one has blades extending spanwise approximately parallel to the axis of rotation. It is also concerned with a specific relation of the impeller to its casing so as to maintain proper gap chord ratios between the blades while the impeller is rotating.

The objects of my invention are first to employ boundary layer energization on the rotor and impeller blades to improve their efficiency and their effectiveness in employing high fluid pressures; second, to employ boundary layer energization on the inner walls or surfaces of the machine housing and the guide vanes if present; and third, to provide the said energization by the action of the rotor itself. Other objects will appear from the detailed description of the drawings.

I carry out these objects by the mechanism illustrated in the accompanying drawings in which—

Figures 1, 1a, 2, 2a, 2b pertain to the theory;

Figure 3 is an external view of a centrifugal blower along the axis of the shaft;

Figure 4 is an external view along a direction transverse to the shaft;

Figure 5 is a fragmentary view of an impeller along the shaft axis;

Figure 6 is a fragmentary top view of an impeller blade;

Figure 7 is a section along the line 7—7 in Figure 5;

Figure 8 is a fragmentary section taken transverse to the shaft of the impeller showing only two blades;

Figure 9 is a section along the line 9—9 in Figure 8;

Figure 10 is a fragmentary plan of a second type of blower;

Figure 11 is a vertical section along the line 11—11 in Figure 10;

Figure 12 is a fragmentary section of a multistage blower with impellers rotatable at different rates of rotation, the section being taken along line 12—12 in Figure 13;

Figure 13 is a horizontal cross section of the same blower, the section being taken along line 13—13 in Figure 12;

Figure 14 is a section along the line 14—14 in Figure 12;

Similar numerals refer to similar parts throughout the several views.

Figure 1A:
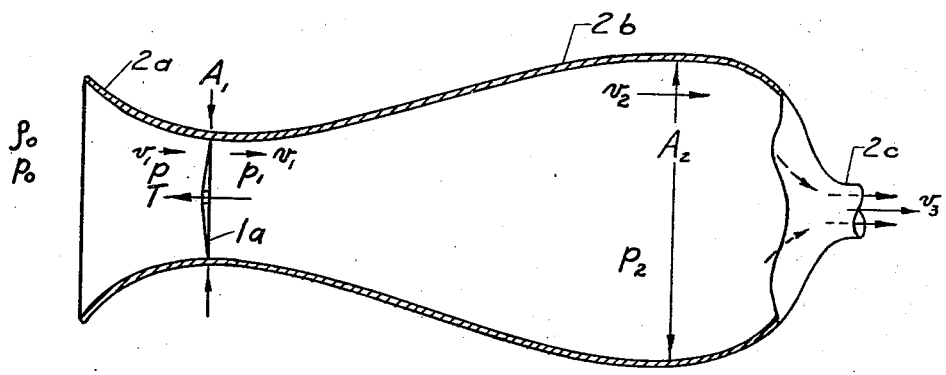

Before proceeding with the discussion of the drawings a brief review of the theory of boundary layer energization and of pumping machinery is here given.

When fluid flows along and in contact with a wall, it is retarded at the surface of the wall by the viscous forces present in all fluids. In fact at the wall the velocity is zero but a short distance out from the wall the fluid stream has practically the normal velocity. The retarded layer of fluid is called the boundary layer. It has a great significance in the flow of fluid along curved surfaces.

If an inviscid fluid flowed along a curved surface the velocity would vary from locality to locality along the surface. In addition the velocity would vary outward from the surface. The velocity at the surface, however, would not be decreased by the friction of the surface because of the assumption that no viscous forces exit. Actually no such inviscid fluid exists but most fluids like air and water have a sufficiently small viscosity that the flow about a curved surface can, as a first approximation to the truth, be assumed to be inviscid fluids. The accuracy of this assumption is very great except very close to the surface where the friction forces chiefly act. These forces cause the formation of a boundary layer of low velocity, but a short distance from the wall the fluid has the velocity that would exist locally if the fluid were inviscid.

In flowing along a surface curved from the flow the particle tends to leave the surface due to centrifugal force but is restrained by the suction arising from the tendency to leave the surface. This phenomenon is well known and need not be further described except to say that on many bodies the greatest suction is near the front of the body. This is true, for instance, on wings and the inner walls of Venturi tubes. This suction of the forward portion is a continual retarding force on the fluid, but the latter continues along the body surface because of its momentum. If, however, the momentum is destroyed, as it is in the boundary layer, by rubbing with the surface, there will occur a reversal of flow. Thus there is a reversal of flow in the boundary layer on surfaces of appreciable curvature and the clash of the oncoming and reversed flow results in a highly turbulent condition of the flow and a failure of the main flow to follow the surface.

The turbulence is evidence of a high resistance between the body and the fluid. The energy to force the flow along against this resistance is many times higher than the energy loss due to the rubbing. This turbulent condition and its high relative resistance can be eliminated by adding energy to the boundary layer so that the velocity therein cannot reverse. A slot placed in the surface and formed to discharge down stream tangentially to the surface with a velocity about as high or higher than the local velocity will speed up the boundary layer and therefore suppress it.

A slot can also be placed in the surface and the boundary layer sucked off so that the flow reversal can never occur.

In both the blowing and suction cases the suppression of the boundary layer requires energy and the processes may be designated under one title of boundary layer energization.

Fans with wing-like blades have been used for blowing against small pressures only. In small sizes the pressures have been correspondingly smaller because of the great rate of rotation required to obtain a high blade-tip speed.

Fans are designed so that the blades operate with true angles of attack corresponding to the greatest ratio of lift to drag on the blade section. This means that the lift coefficient and the angle are small because the maximum ratio of lift to drag occurs at small values of the lift and angle. The chief reason that the maximum ratio of lift to drag occurs at small angles is that the induced drag increases as the lift squared. The induced drag, as is well known, arises because of the tips which permit a vortex system to form.

The lift of a wing is given by $$L = C_L \frac{\rho V^2}{2} A \qquad (1)$$

where $C_L$ is the lift coefficient, $A$ is the area, $\rho$ is the mass density of the air and $V$ is the wind velocity. Since the lift is proportional to the lift coefficient it is best to speak in terms of $C_L$ because it is independent of the density, area and velocity. In a like manner the total drag of a wing is $$D = C_D \frac{\rho V^2}{2} A \qquad (2)$$

where $C_D$ is the drag coefficient. The drag may be separated into two parts, the induced drag due to the finiteness of the span, and the profile drag due to the air friction. That is, $$D = (C_{D_i} + C_{DP}) \frac{\rho V^2}{2} A \qquad (3)$$

where the induced drag coefficient $$C_{D_i} = \frac{C_L^2}{\pi R}$$

and $R$ is the aerodynamic aspect ratio. $C_{DP}$ is the profile drag coefficient.

In my fans I provide a tip shield at the ends of the blades which partly stops the formation of the tip vortices. They will continue to form in part because the friction of the air with the surface of the shield dissipates some of the kinetic energy of the fluid as heat. Since the dynamic pressure of the fluid is equal to the kinetic energy, there is a loss of dynamic pressure which if present would prevent the air of greater pressure about the blade from flowing into the low pressure region near the blade surface and forming a vortex. Finally, by adding energy to the layer of fluid adjacent the surface of the tip shield I prevent entirely the formation of the tip vortex.

The elimination of the induced drag makes it possible to use lift coefficients, as high as 5 for the blade sections economically; and values still higher if pressure and rate of rotation are more important than the efficiency. An ordinary wing has a maximum lift coefficient of about 1.5 so that it is necessary to provide special blades to attain a value $C_L = 5$. High lift coefficients are obtainable through alterations in the boundary layer.

The construction to obtain the elimination of the induced drag and create high values of $C_L$ will be described in detail in connection with the drawings.

It is customary to refer to blades following helical paths in air as airscrews. For fluids generally the term fluidscrew is used herein.

I have used the term "blade" as a general term for any impeller vane including the term "wing". I use the term "wing" to specify a body such as is usually understood by this term in the science of aerodynamics, namely a body of substantially streamline cross section characterized by a rounded nose and a smoothly curved upper surface of increasing radius of curvature from locality to locality progressing toward the trailing edge. The lower surface may be flat, convex or in part concave. The locality of maximum thickness is usually between 25 per cent and 50 per cent of the chord length measuring from the nose of the section. Wing sections are shown in Figures 1 and 12, for instance.

In Figure 1 a blade element is shown in relation to the peripheral velocity $\omega r$ and the flow velocity $v$. The angular velocity is $\omega$ (omega). The resultant velocity is $V$. If the element is a portion of a fluidscrew blade it may be considered as representative of the whole fluidscrew if the velocity vectors are those corresponding to the blade element at two-thirds radius. If the blade is parallel to the axis of rotation then all elements of the blade have the same peripheral velocity and experience the same relative flow velocity. The area of the element is in either case the area of all the blades. It is well known in airscrew theory that the characteristics of efficiency and pressure for the whole propeller can be represented by those of the blade element two-thirds of the radius out from the hub assuming the elemental area equal to the total blade area.

The angle $\alpha$ between the resultant wind V and the zero lift line in the wing is the angle of attack. As is well known in aerodynamics, the zero lift line for a wing section is the line along which the relative wind blows when the lift is zero and is the line passing through the trailing edge of the airfoil section and the mid point of the mean camber line. The latter line is found by passing a line through the centers of circles inscribed in the wing section contour tangent thereto. This geometric construction is well known.

The relative wind V gives rise to the lift coefficient $C_L$ and the drag coefficient $C_D$. By the means of boundary layer energization and the tip shield I describe, the drag coefficient can be made very small so that it may be neglected in comparison to the large lift coefficient. The component of the lift in the direction of $v$ is the thrust T which may be represented by the thrust coefficient $C_T$ as $$T = C_T q A_b = C_L q A_b \cos \beta \qquad (4)$$

where $$q = \frac{\rho_0 V^2}{2}$$

and $A_b$ is the total blade area. See Figure 1.

Let the blower be the fluidscrew $1a$ in Figure $1a$. The casing is $2a$. The circular cross sectional area of the throat is $A_1$. The cross section at the end of the expansion segment or diffuser $2b$ is $A_2$. The blower $1a$ draws in fluid from the region ahead where the static pressure is $p_0$ and the velocity is zero. Just ahead of the blower the static pressure is $p$ and the velocity is $v_1$. There is a sudden rise in the static pressure at the blower so that just at the rear of the blower the pressure is $p_1$ and the velocity is still $v_1$. The diffuser serves to convert as much as desired of the dynamic pressure $$\frac{\rho v_1^2}{2}$$

at the blower to static pressure.

The blower $1a$ creates the thrust T acting on the fluid. This thrust divided by the area $A_1$ represents a pressure acting on the cross section of the flow; and this pressure must be equal to the pressure rise $p_1 - p_0$ plus the dynamic pressure $$\frac{\rho v_1^2}{2}$$

imparted to the fluid. Call the total pressure H.

$$H = p_1 - p_0 + \frac{\rho v_1^2}{2} \qquad (5)$$

Then it must be that $$C_L q \frac{A_b}{A_1} \cos \phi = H \qquad (6)$$

as required. Or if $\omega$ (omega) is the angular velocity of the blade and $\omega r$ is the linear velocity at the blade element at the two third radius then $$H = C_L \frac{\rho_0}{2} \frac{A_b}{A_1} (v_1^2 + \overline{\omega r}^2) \frac{R}{(v_1^2 + \overline{\omega r}^2)^{1/2}} \qquad (7)$$

$$= C_L \frac{\rho_0}{2} \frac{A_b}{A_1} \overline{\omega r}^2 \left(0.96 + 0.40 \frac{v_1}{\omega r}\right) \qquad (7a)$$

where $\rho_0$ is the mass density of the fluid at the pressure $p_0$ ahead of the pump. See Figure $1a$. For $v$ equal to or less than $r$, (it is known in mathematics that $(a^2+b^2)^{1/2}$ equals $(0.06a+0.40b)$ to a high degree of accuracy for $a$ equal to or greater than $b$) since $$V = (v_1^2 + \overline{\omega r}^2)^{1/2} \text{ and } \cos \phi = \frac{\omega r}{V}$$

The greatest efficiency is obtained when $v_1 = \omega r$ resulting in $\phi = 45°$, as is well known in aerodynamic theory. Therefore $$H = \sqrt{2} C_L \frac{\rho_0 A_b}{2 A_1} \overline{\omega r}^2 \qquad (8)$$

The angle of attack $\alpha$ is $$\alpha = \beta - \phi \qquad (8a)$$

where $\beta$ (beta) is the pitch angle and $\phi$ (phi) is the angle of the helical path of the blade element as indicated in Figure 1, or for 45 degrees $$\alpha = \beta - 0.78 \text{ in radians.}$$

Now, as is well known in aerodynamics, $$C_L = 2\pi\alpha; \quad (\alpha \text{ in radians}).$$

That is, the slope of the lift curve versus $\alpha$ is $2\pi$, so that $$C_L = 2\pi(\beta - 0.78)$$

Using this value of $C_L$ Equation (8) becomes $$H = \pi\sqrt{2}(\beta_u - 0.78)\rho_0 \frac{A_b}{A_1} \overline{\omega r}^2 \qquad (9)$$

or the pitch angle at the ⅔ radius is in radians $$\beta_u = \frac{H}{\pi \sqrt{2} \rho_0 \frac{A_b}{A_1} \overline{\omega r}^2} + 0.78 \qquad (10)$$

where I insert the subscript $u$ to indicate that this particular pitch angle $\beta_u$ is related to the upper limit for my claims to be discussed further later.

I set the lower limit of the pitch angle $\beta_l$ by the following considerations. The theory given above is based on the assumption that the lift coefficient $C_L$ retains its value for a given angle of attack $\alpha$ as the angle $\phi$ is changed. I call this value of $C_L$ the monoplane value, since this term is used in aerodynamics. If two monoplane wings are placed close one above the other the value of $C_L$ decreases both for the same angle of attack and the same drag coefficient. It is found that the loss in lift coefficient becomes appreciable when the value of the ratio of gap to chord becomes less than one. I therefore take this as the permissible lower limit for the gap chord so as to conform to the above theory.

A blade element rotating about an axis in a relative axial flow can be regarded as describing a helix, as indicated in Figure $2a$. If the helix for each blade is unrolled it will be noted that at any particular instant there is a gap G separating the blade elements. This gap depends on the number of blades and in terms of the chord can be expressed as $$\frac{G}{c} = \frac{2\pi r}{nc} \sin \phi = \frac{2\pi r v_1}{nc \, \omega r} \qquad (11)$$

(The chord $c$ is indicated in Figures $2b$ and 14) as may be derived from the relative position of blades E and F in Figure $2b$ and where $n$ is the number of blades forming the fluidscrew or blower impeller. For small angles $\sin \phi$ is very closely $v/r$ in radians.

Since the gap chord ratio is to be one, $$\frac{v_1}{\omega r} = \frac{nc}{2\pi r} \qquad (12)$$

If the blades are spaced axially a distance $d$ as well as 180 degrees peripherally as, for instance, blades E and J, the distance $d$ adds to the gap the amount $d \cos \phi$. The addition to the gap-chord ratio is therefore $$\frac{d}{c} \cos \phi = \frac{d}{c}\left(1 - \frac{v_1}{r}\right) = \frac{d}{c}\left(1 - \frac{nc}{2r}\right)$$

from the fact that $\cos \phi$ is very closely equal to the expansion in the parentheses and from Equation (12). The ratio for both axial and peripheral displacement is therefore $$\frac{G}{c}=\frac{2\pi r}{nc}\cdot\frac{v_1}{\omega r}+\frac{d}{c}-\frac{d}{c\omega r}\cdot\frac{v_1}{}$$

$$\frac{v_1}{\omega r}=\frac{n(c-d)}{2\pi r-nd} \qquad (12a)$$

making the value of the gap chord ratio equal to one as previously remarked.

The value of Equation (12a) is especially important in the case where two blades are rotated in opposite directions. The distance $d$ is also to be interpreted as the distance between blades of different rotors if the blades are parallel or lie along the axis of rotation as shown in Figure 12, to be described later. In this case the distance $d$ is to be measured between trailing and leading edges or the circles tangent to these edges.

If a blower without a proper casing is to create high pressures the velocity $v$ is low so that the angle $\phi$ is small (Figures 1 and 2b) with the result that the gap-chord ratio is less than one. There is then a loss in $C_L$. It is possible, however, to obtain the high values of $C_L$ necessary for high pressures by boundary layer energization and to preserve this high $C_L$ value by a properly designed casing or housing. The casing should have a throat portion of such a cross sectional area in relation to the other cross sections that the proper velocity is created through the plane of rotation of the blower to preserve a gap-chord ratio greater than one. The proper proportions will be described later.

Substituting from Equation (12) into Equation (7a) the latter becomes $$H=C_L\frac{\rho A_b}{2A_1}\overline{\omega r}^2\left(0.96+0.40\frac{nc}{2\pi r}\right) \qquad (13)$$

As above $$C_L=2\pi\alpha \text{ and } \alpha=\beta-\phi=\beta-\cot^{-1}\frac{\omega r}{v_1}$$

or very closely $$\alpha=\beta-\frac{v_1}{\omega r}-\frac{v_1^3}{3\omega^3 r^3} \text{ radians}$$

after a well known expansion formula. Hence $$C_L=2\pi\left(\beta-\frac{v_1}{\omega r}-\frac{v_1^3}{3\omega^3 r^3}\right) \qquad (14)$$

Using the value of $$\frac{v_1}{\omega r}$$

from Equation (12) Equation (13) becomes with the aid of Equation (14), ignoring the last term as insignificant, $$H=\left(2\pi\beta-\frac{nc}{r}\right)\frac{\rho A_b}{2A_1}\overline{\omega r}^2\left(0.96+0.40\frac{nc}{2\pi r}\right) \qquad (15)$$

But $A_b=ncr$ where $r$ is two-thirds of the radius, since the inner third is practically ineffective because of its low relative fluid velocity. The inner third is preferably enclosed by a streamline housing. If more of the blade than one-third is enclosed in a fairing or by the hub the dimension $r$ is to be taken as the actual blade length. That is, $r$ is never larger than two-thirds of the radius from axis of rotation to blade tip in the case of a fluid screw.

Figure 2A:
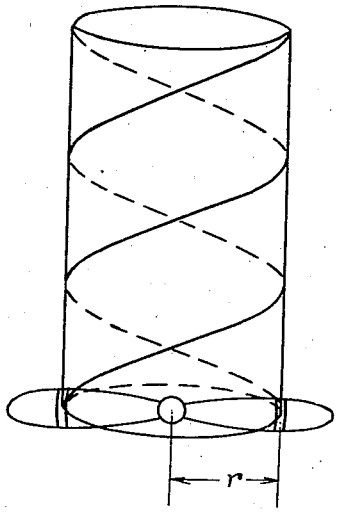
Figure 2B:
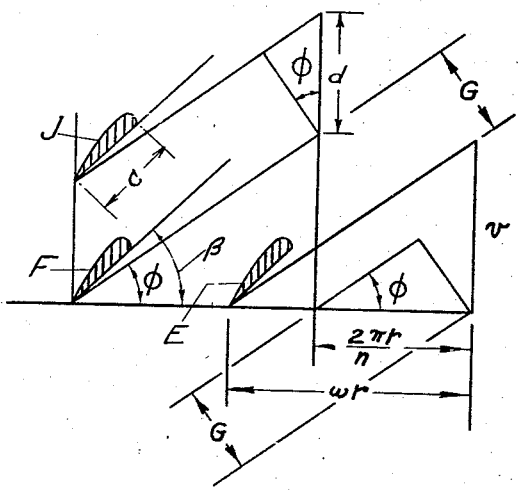

In Figure 1a since no energy is added between the rear of the blower and the section $A_2$ Bernoulli's equation will hold for the flow between these sections. Thus $$p_1+\frac{\rho_0 v_1^2}{2}=p_2+\frac{\rho_0 v_2^2}{2} \qquad (16)$$

or $$p_1=p_2+\frac{\rho_0}{2}(v_2^2-v_1^2) \qquad (17)$$

Hence from Equation (5) H may also be written as $$H=p_2-p_0+\frac{\rho_0 v_2^2}{2} \qquad (18)$$

Present day fan blowers are not used for a pressure difference in excess of 6 inches of water, which is 31.2 lbs. per square foot. So the total head limit of present day blowers utilizing wings as blades is $$H=31.2+\frac{\rho_0 v_2^2}{2} \qquad (19)$$

The blowers I describe are best suitable for total pressures higher than $$H=35 \qquad (20)$$

which is not attainable by old type blowers.

Hence the preferred range of characteristics is given by the following equations. For a given rate of rotation and blade form, the pitch angle should lie between the values $$\beta_l=\frac{31.2+\frac{\rho_0 v_2^2}{2}}{\frac{\rho_0 ncr\omega^2}{4\pi^2}\left(0.96+0.20\frac{nc}{\pi r}\right)}+\frac{nc}{2\pi r} \qquad (21)$$

and $$\beta_u=1.2\left[\frac{31.2+\frac{\rho_0 v_2^2}{2}}{2\rho_0 ncr\omega^2}+0.78\right] \qquad (22)$$

where $\beta_l$ and $\beta_u$ refer to lower and upper values of the pitch angle $\beta$ as previously remarked.

I have inserted the factor 1.2 to care for the fact that the efficiency does not decline rapidly near the value of the angle $\beta=45$ degrees. It is practical to go somewhat beyond this value of $\beta$ and accept the small loss in efficiency although I do not prefer to do so.

If, moreover, the rate of flow across the sectional area $A_2$ is very small, that is, practically all of the kinetic energy $q$ put into the fluid by the fan is converted to static pressure, then the second term of the numerator can be neglected as insignificant in comparison to the first term to establish the limits for the pitch angle. Then $$\beta_l=\frac{1400}{\rho_0 ncr\omega^2(0.96+0.20\ nc/\pi r)}+\frac{nc}{2\pi r} \qquad (21a)$$

and $$\beta_u=\frac{30}{\rho_0 ncr\omega^2}+0.93 \qquad (23)$$

both values of $\beta$ being in radians. To obtain degrees multiply by 57.3.

For the pressures at which these fans operate it is also impracticable to have speeds $\omega r$ less than 200 feet per second. In this case Equations (21a) and (23) become $$\beta_l=\frac{0.035r}{\rho_0 nc(0.96+0.20\ nc/\pi r)}+\frac{nc}{2\pi r} \qquad (21b)$$

and $$\beta_u=\frac{0.075r}{\rho_0 nc}+0.93 \qquad (23a)$$

The value of the mass density $\rho_0$ for the above equations corresponds to the pressure $p_0$. The units for the Equations (19) to (23) are pounds, square feet and seconds.

The proper ratio between A and $A_2$ to give the correct velocity at the fan so that the gap-chord ratio is above the minimum required for good efficiency is determined as follows. Since the same quantity of fluid passes each cross section.

$$A_1 v_1 = A_2 v_2 \quad (24)$$

and so $$\frac{A_2}{A_1} = \frac{v_1}{v_2}$$

and from Equation (12)

$$\frac{A_1}{A_2} = \frac{2\pi v_2}{n c \omega} \quad (25)$$

That is, $A/A_2$ is equal to or less than the right-hand term. For $\omega r = 200$ this equation becomes $$\frac{A_1}{A_2} = \frac{\pi r v_2}{100 n c} \quad (25a)$$

Thus the cross section ratio depends on the same characteristics of the fan as the blade pitch $\beta$, namely the number of blades, their chord and their rate of rotation. In Equation (25) $v_2$ cannot be taken as zero but must be given its actual value. The value of the discharge velocity through the take off tube $2^c$ is $v_3$ which will be related to $v_2$ according to an equation like (24).

The theory given establishes the cooperation between boundary layer energization on the blades, the pitch of the blades and the form of the casing for the blower. What is said by the equations may be repeated by other symbols, namely, words as follows:

Boundary layer energization on the blades will give rise to high lifting capacity but it is necessary to avoid the destruction of this capacity by always ensuring that there is sufficient gap between the blades as they move in their helical paths relative to the pumped flow. This gap is ensured only if there is a sufficient velocity through the impeller for a given rate of rotation. A housing of constricted form speeds up the flow at the impeller according to well known physical principles. The pitch of the blades is selected to generate this said flow in conjunction with the casing and create the pressure rise required.

Some claims are predicated on the static pressure rise only since it is conceivable even in practice that the static pressure rise required may be high and the volume of discharge very small, approaching the vanishing point.

I have developed the theory chiefly by reference to a fluidscrew, but it is to be noted that it is applicable to all blades of wing like form whether they form screws or have their spans substantially parallel to the axis of rotation. Also, the casing need not be the symmetrical tube shown in Figure 1a. It may have the form shown in Figures 10, 11, 12, and 13, since these present an increasing cross section of the flow with increasing distance from the axis of rotation.

I call the leading edge that edge of the blade which first attacks the relative flow. This follows the sense of the nomenclature in aeronautics.

Present day fans are designed to operate with an angle of attack $\alpha$ corresponding to the maximum ratio of lift to drag, as has already been mentioned. Noting the relation between $C_D$ and $C_L$, as given by Equation (3), it is straightforth to determine by the calculus that the value of $C_L$ which makes the lift-drag ratio a maximum is $$C_L = (\pi R C_{DP})^{\frac{1}{2}} \quad (26)$$

where R is the aspect ratio of the blade. The angle of attack corresponding to this value of $C_L$ is given by $$\alpha_1 = \frac{d\alpha}{dC_L} C_L \quad (27)$$

where $d\alpha/dC_L$ is the reciprocal of the slope of the lift curve, $C_L$ plotted against $\alpha$. The slope has a value of $2\pi$ as is well known in aerodynamics. Hence $$\alpha_1 = \frac{C_L}{2\pi} = \frac{(\pi R C_{DP})^{\frac{1}{2}}}{2\pi} = \left(\frac{R C_{DP}}{4\pi}\right)^{\frac{1}{2}} \quad (28)$$

R can be taken equal to $r/c$ or the blade length divided by the chord at the 2/3 radius. It is also known that the profile drag coefficient $C_{DP}$ is chiefly a function of the maximum thickness $t_m$ expressed as a fraction $t$ of the chord $c$, as shown in Figure 14. That is, $$C_{DP} = (0.01 + 0.01 t - 0.1 t^2) \quad (29)$$

Therefore $$\alpha_1 = \left[\frac{R}{4\pi}(0.01 + 0.01 t + 0.1 t^2)\right]^{\frac{1}{2}} \quad (30)$$

in radians.

The values of $\alpha$ that I use are larger than $\alpha_1$. The upper limit of $\alpha$ can be determined as $$\alpha_2 + \frac{d\alpha}{dC_L} C_L \max = \frac{1}{2\pi} \cdot 4\pi = 2 \text{ radians} \quad (31)$$

It is well known that the maximum possible lift coefficient is $4\pi$. I prefer, however, to use values of $\alpha_2$ less than 1.5 radians.

From Equation (8a) and (12)

$$\alpha_1 = \beta - \frac{v_1}{\omega r} = \beta - \frac{nc}{2\pi r} \quad (32)$$

and from Equations (30) and (32)

$$\beta_1 = \left[\frac{r}{4\pi c}(0.01 + 0.01 t + 0.1 t^2)\right]^{\frac{1}{2}} + \frac{nc}{2\pi r} \quad (33)$$

In like manner for the upper limit $$\beta_2 = 1.50 + \frac{nc}{2\pi r} \quad (34)$$

If the fluid is appreciably compressible Equation (24) should be written as $$\rho_1 A_1 v_1 = \rho_2 A_2 v_2 \quad (35)$$

and since for isothermal compression $$\frac{\rho_2}{\rho_1} = \frac{p_2}{p_1} \quad (36)$$

$$\frac{A_1}{A_2} = \frac{\rho_2 v_2}{\rho_1 v_1} = \frac{p_2}{p_1} \cdot \frac{2\pi v_2}{nc\omega} \quad (37)$$

If the compression is adiabatic $$\frac{p_2}{p_1} = \left(\frac{\rho_2}{\rho_1}\right)^k \quad (38)$$

whence $$\frac{A_1}{A_2} = \left(\frac{p_2}{p_1}\right)^{1/k} \frac{2\pi v_2}{nc\omega} \quad (39)$$

when $k$ is the ratio of specific heats for the fluid under consideration and equal to 1.41 for air.

Equation (32) can also be written for the case including the displacement $d$ as $$\alpha_1 = \beta - \frac{v_1}{\omega r} = \beta - \frac{n(c-d)}{2\pi r - nd}$$

following from Equation (12a).

Then the limits for 1 and 2 are $$\beta_1 = \left[\frac{r}{4\pi c}(0.01 + 0.01 t + 0.1 t^2)\right]^{\frac{1}{2}} + \frac{n(c-d)}{2\pi r - nd} \quad (40)$$

and $$\beta_2 = 1.50 + \frac{n(c-d)}{2\pi r - nd} \quad (41)$$

It also follows that the area ratio should be less than $$\frac{A_1}{A_2} = \frac{v_2(2\pi r - nd)}{n(c-d)} \qquad (42)$$

ignoring the change in density; or $$\frac{A_1}{A_2} = \left(\frac{p_2}{p_1}\right)^{1/k} \cdot \frac{v_2(2\pi r - nd)}{n(c-d)} \qquad (43)$$

including a density change due to adiabatic compression.

In any compression the presence of adiabatic or isothermal or some other type of compression will depend on the heat radiation from the blower casing and therefore depends on insulation and cooling medium.

The manner in which the above theory of Equations (4) to (25) is carried into practice is illustrated in Figures 10 to 14. I first, however, describe some of the simpler applications of boundary layer energization to blowers.

If the blades are relatively short in span, as when a large portion of a fluidscrew is formed by a hub fairing, or where the blades are short and substantially parallel to or along the axis of rotation, the aspect ratio should be defined as the span S (see Figure 11) divided by the average chord c. In this case Equation (33) becomes $$\beta_1 = \left[\frac{S}{4\pi c}(0.01 + (0.01 t + 0.1 t^2))\right]^{\frac{1}{2}} + \frac{nc}{2\pi r} \qquad (44)$$

and Equation (34) remains unchanged as $$\beta_2 = 1.50 + \frac{nc}{2\pi r} \qquad (45)$$

and $r$ is to be interpreted as the distance from the axis of rotation to the mid length of the span S. If the blades are parallel to the axes the distance $r$ is the same to all points of the span. The distance is to be measured to the leading edge.

The equations for the area ratios of the cross sections of the housing remain unchanged.

A fan with blades parallel to the axis has the advantage of creating a constant pressure along the span of the blades. This is not true in the case of blades perpendicular to the axis because of the large difference in velocity between the elements near the hub and those near the tip.

A centrifugal blower 1 is illustrated in Figures 3 to 9. Fluid is inducted through the inlet opening 2 and discharged through 3. The blades 4 are fixed to the shaft 5 and rotatable therewith. Due to centrifugal action on the fluid the blades cause a discharge from 3.

The blades are formed so that across the inlet opening they have a leading edge like a wing as shown particularly in Figures 4, 5 and 7. The curvature causes a smoother flow of the air into the casing and in conjunction with the means of boundary layer energization employed and to be described creates a high efficiency.

Each blade has a hollow interior, as shown in Figure 7, with a slot in the top or suction surface. The face which attacks the air I call the lower or pressure face or side. The other side is the upper or suction side. The blade interior communicates with the opening 4a in the hub element 5a to which the blades are attached. A rotation of the blades causes a flow out the openings 6 due to centrifugal action. Other slots 6a are also in communication with the blade interior and pass fluid outward along the surface to energize the boundary layer.

The slots should be formed carefully so that the sides of the slots overlap. With such a construction the discharge jet will be along the surface and not normal to it. Also, the slots should have a width $w$ of about 2 per cent of the blade width for the most economical operation. Normally the width runs from 1 to 6 percent.

After air flows through the inlet 2 into the casing it must flow radially between the blades and since these diverge rapidly there is a tendency for the fluid to leave the walls with the formation of turbulence and a consequent loss in efficiency. By discharging fluid out such openings as 6a the fluid is made to follow the blade contour even for widely separated blades.

In Figures 10 and 11 are illustrated two views of a blower with blades lying along the axis of rotation and employing boundary layer energization on the surfaces. This blower differs from that in Figures 3 and 4 by the fact that the inlet area is large and the axial blades have a leading edge disposed along the axis and presented to the flow past them. Also, the flow into the casing is induced by a separate screw rather than by the curved edge of the axial blade itself. The blades and casing conform to the equations given on preceding pages. That is, the fact that the casing has a right angle turn does not alter the applicability of the equations developed for Figure 1a.

The fluidscrew 7 composed of the radial blades 7a carries at each tip the axial blades 8, all mounted on the shaft 9 and rotatable therewith in the casing 10. The fluidscrew is hollow and the interior communicates to the atmosphere or other source of pressure through the opening 11. Each axial blade 8 is hollow and has in its suction surface the slot 12.

The rotation of the blades induces a flow out the slots which energizes the boundary layer and permits the use of a large angle of attack for the blade.

The casing 10 consists of two parallel plates 10a which guide the fluid. If desired they may terminate in an annular tube for the collection of the fluid. Such a tube is shown later in Figures 12 and 13.

A multistage blower is shown in Figures 12 and 13. The blades and casing conform to the equations given on preceding pages. In this figure for the first stage $v_2$ can be taken as indicated and $A_2$ will be measured at this locality, namely, just ahead of the leading edges of blades 15. The area $A_1$ is the area swept by the trailing edges of blades 8. The inner blower consists of the hollow fluidscrew 7 and axial blades 8. The fluidscrew and axial blades provide for the first two stages of compression. They are rotated as a unit by the shaft 9a. The fluid is discharged from the blades 8 radially between two diverging walls 13 which form in section a draft tube or diffuser which serves to convert the velocity pressure into static pressure. Since the walls diverge rapidly and therefore include an angle greater than 7 degrees a means is provided to compel the flow to follow the walls 13. This means consists of annular airfoils 14 encircling the blades 8. The slots between the airfoils 14 and the wall 13 have an entrance in line with the path of the discharged air from the blades 8. The flow through the slot energizes the boundary layers on the walls 13 and the fluid then follows the wall instead of separating from it with a turbulent layer in between.

The third stage of the blower is formed by the wings 15 carried on the plate 16. At each end the wings are attached to a hollow ring 17. The cross section of the ring is U-shaped with the open side facing the flow from the second stage. Each wing has a hollow interior in communication with the interior of the ring. Also, each wing has a slot in its suction side for the discharge of fluid which enters the open side of the ring 17. There is also a slot 17a in each hollow ring 17 so that the boundary layer on the ring is energized; and this action precludes the formation of a vortex at the end of the blade. The jet issuing from 17a maintains the velocity about the wing right up to the ring surface. Wall 13a which is in fact a continuation of walls 13 forms a collector tube having the lead-off tube 18. Airfoils 14a serve to energize the boundary layer in the same manner as the airfoils 14.

The walls 13 are held in proper relation by the struts 19.

A motor 20 rotates the plate 16 and blades 15 since the former is fixed to the motor shaft 21. The latter shaft passes through the shaft 9a and carries at the end opposite to the motor the internal gear 22. See Figure 12. The fluidscrew 7 and blades 8 are free to turn about the shaft 21 but are driven by it by means of gears 23, 24, 25, and shaft 26. The shaft 26 is borne in suitable bearings formed in the projection 27 of the casing wall 13. It will then be understood that the blades 8 and 15 are rotated by the motor 20 in opposite directions and at different speeds. As may be observed from the gear diameters the inner blower formed by blades 8 rotates at a greater angular rate than the blades 15. This difference in rate is one of the features of this invention.

The gear 25 is on an end of shaft 9a which is borne in a bearing supported by radial struts 28 which cross the fan inlet 2 but do not obstruct it appreciably.

In Figure 14 is shown a cross section of the blade 15. It should be noted that the side walls of the slot 12 overlap so that the discharge is tangentially along the surface. If the side walls did not overlap there would be a flow perpendicular to the wing surface.

Figure 15:
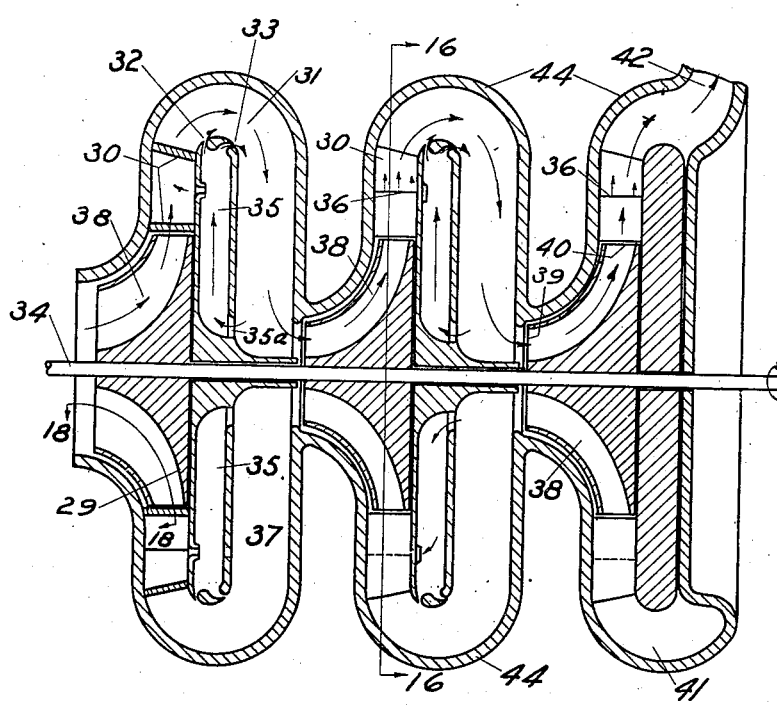
Figure 15 is a longitudinal section through the axis of a multistage compressor.
Figure 18:
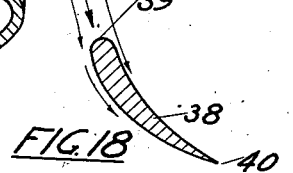
Figure 18 is a section along the line 18—18 in Figure 16.
Figure 16:
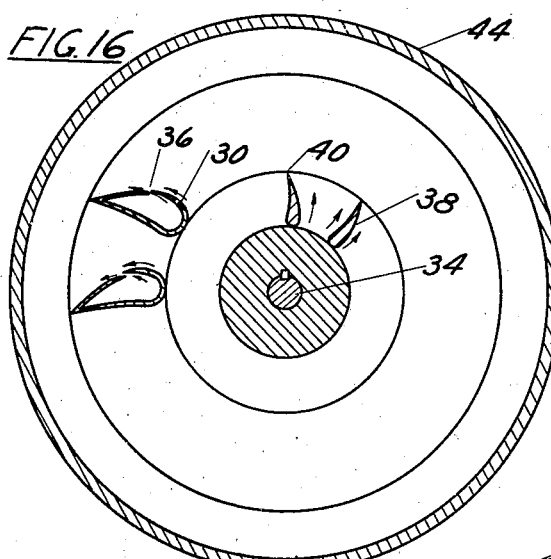
Figure 16 is a radial section along the line 16—16 in Figure 15.
Figure 17:
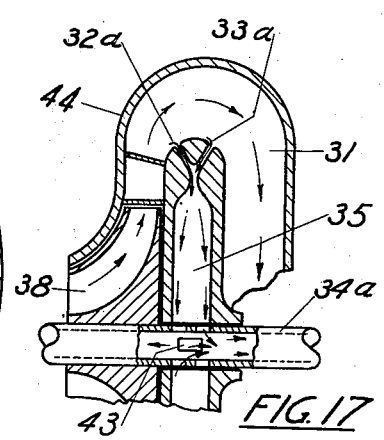
Figure 17 is a fragmentary longitudinal section through one stage of a compressor to illustrate one form of boundary layer energization on the compressor walls.

Another form of the invention is shown in Figures 15, 16 and 17. They illustrate a multistage centrifugal blower having, as is usual, abrupt changes in direction of the flow between stages which always cause turbulence and loss of efficiency.

The first impeller is 29 discharging the air radially past the guide vanes 30 shown in Figures 15 and 16. The conduit between the first and second stages is 31. Because of the short radius of the wall the fluid tends to leave the wall of the conduit on the inside of the curve. The separation of the flow may be prevented by suitable slots 32 and 33 formed in the wall and extending peripherally around the conduit wall. Thus any section through the shaft 34 of the blower would preferably show the slots 32 and 33.

Fluid to form the jets discharged from the slots 32 and 33 is supplied by the passage 35 having the inlet opening 35a into the conduit 31 where the latter is wide or large in cross section and the static pressure is therefore large. The opening is also preferably located near a bend in the conduit on the pressure face of the wall because the centrifugal pressure is high on such a wall which curves toward the flow and serves to change the flow direction.

The guide vanes 30 have slots 36 in their suction surfaces and these slots are served with fluid from the passage 35 through the duct 37. This improves the efficiency of the guide vanes which ordinarily have cross sectional areas between them of rapidly increasing magnitude in the direction of the flow so that the flow does not follow the vane walls. The slots, and jets therefrom, assure the non-separation of the flow for all quantities of discharge from the pump.

Each impeller is constituted of a series of vanes 38 having their leading edges at 39 and their trailing edges at 40, as numbered in the third stage of Figure 15.

The fluid from the last stage of the blower is collected in the duct 41 extending about the blower circumference.

The fluid may also be induced to follow the curvature of the conduit 31 by means of suction. See Figure 17. Since the pressure in the conduit is higher than the external pressure, slots 32a and 33a when connected to the atmosphere will lead off the boundary layer forming on the curved portion of the conduit wall turning from the flow. The communication with the atmosphere is established through the passage 35 which communicates with the interior of the shaft 34a through openings 43 in the hollow shaft's wall. The fluid can escape from the shaft through an open end or other openings in the side wall. These openings are not shown.

It is not necessary that the slots 32a and 33a communicate with the atmosphere. Another region of low pressure would do as well.

It is not believed necessary to give an external view of the centrifugal blower shown in axial section in Figure 16, since, with the exception of the bed supports, the machine is symmetrical. The means to support the blower on the foundation is readily supplied by those acquainted with machinery.

Of the two means for energizing the boundary layer on the wall of the conduit 31 I prefer the blowing means illustrated in Figure 15.

The case of the impeller is indicated by 44 and the take off duct by 42.

While specific forms of the invention have been illustrated and described, it is to be understood that I intend to claim my invention broadly as indicated by the scope of the claims.

I claim:

1. In combination a rotatable first blade having a free leading edge directed more along its axis of rotation than transverse thereto, a second rotatable blade having a free leading edge bathed by a fluid flow and directed more along its axis of rotation than transverse thereto, means to rotate the said blades in opposite directions, means of conduction to convey fluid impelled by one said blade to the other said blade both blades serving by the impact of their external surfaces on the fluid to motivate a main flow, said second blade having an opening in its upper surface in communication with its interior, and means to admit the flow induced by said first blade to the interior of the second blade for discharge through its said opening to energize the boundary layer thereon.

2. In combination a rotatable blade having a leading edge directed more along its axis of rotation than transverse thereto, a second rotatable blade having a leading edge directed more along its axis of rotation than transverse thereto, means to rotate the said blades both blades serving by the impact of their external surfaces on the fluid to motivate a main flow, both said blades having free leading edges receiving the flow thereacross, means of conduction to convey said fluid impelled by one blade to the other blade for further impulsion, one of said blades having an opening in its upper surface in communication with the blade interior, and means to admit the said flow induced by one of said blades to the interior of the other said blade for discharge through its said opening to energize the boundary layer thereon, said blades having surfaces aft of the slots turning from the flow so that the main flow tends to leave the surface.

3. A fluid machine comprising a blade rotatable about an axis, another blade rotatable about an axis, both blades serving to impel a main fluid flow, means to rotate the blades, and a conduit to convey fluid impelled by one said blade to said other blade for further impulsion, said conduit between said blades having a side wall curved along the direction of flow so that the flow tends to leave the wall, said conduit having an annular cross section and having an opening in its side wall communicating exteriorly of said conduit, one of said blades by its pumping action on the fluid causing a flow through said opening to energize the boundary layer on said wall.

4. A fluid machine comprising an element rotatable about an axis, a blade having a free leading edge lying more along the axis of rotation than normal thereto, a hollow arm to attach the blade to the element, said blade having a slot in its upper surface and means to admit fluid to the blade opening through the hollow arm for emission from said slot to energize the boundary layer on the blade, said slot extending along a major portion of the blade span and having sides overlapping rearward to direct fluid substantially tangentially to the blade upper surface.

5. In combination a plurality of hollow blades rotatable about an axis directed substantially along the spans of said blades and having upper surface openings in communication with the interior of the blades and directed along the surface toward the trailing edges, a shaft to rotatably support the blades, a pumping means having an impeller operably connected to the shaft for a greater speed of rotation than said blades and means of communication through the blade interiors between the pumping means and the openings to produce a flow through them to energize the boundary layer on the blades.

6. A fluid machine comprising in combination a casing having an inlet and an exit with a fluid flow therethrough, a plurality of impellers rotatable about axes and having different rates of rotatation in said fluid flow, and means to rotate the impellers in coordinated relationship so that an impeller of small radius has an angular velocity greater than an impeller of large radius, said impeller of large radius being composed of hollow blades having slots in their upper surfaces in communication with their interiors, and means to admit to the blade interiors fluid impelled by the impeller of smaller radius for discharge from said slots to energize the boundary layer on said blades.

7. In combination, a casing of variable cross section including an expansion segment to conduct a gas within, a plurality of blades rotatable in said casing about an axis, said blades having perforated upper surfaces to form spanwise slots in communication with the blade interiors, said slots having sides overlapping rearward sufficiently to direct the slot flow substantially along the surface, toward the rear edge, means to cause a flow through the openings to energize the boundary layer to provide a high thrust capacity per unit of blade area, and a power means to rotate said wings to impel the gas in the casing, said blades having pitch angles related to the angular velocity in a range of values defined by the equations $$\beta_l = \frac{1400}{\rho_0 n c \omega^2 \left(0.96 + 0.20\frac{nc}{\pi r}\right)} + \frac{nc}{2\pi r}$$

determining the lower limit in radians and $$\beta_u = \frac{30}{\rho_0 n c \omega^2} + 0.93$$

determining the upper limit, said casing having a ratio of the cross sectional area swept by the rotatable blade to the cross sectional area at the end of the expansion segment equal to or less than $$\frac{A_1}{A_2} = \frac{2\pi v_2}{n c \omega}\left(\frac{p_2}{p_1}\right)^{\frac{1}{1.4}}$$

so that for the pitch angles, angular velocity, velocity of discharge and compression ratio given by the equations the velocity past a rotatable blade is large enough to insure a gap chord ratio greater than unity between said blades to preserve their effectiveness due to energization of the boundary layer in creating a thrust on the impelled fluid.

8. In combination, a casing of variable cross sectional area perpendicular to the flow to conduct a gas within, a plurality of blades rotatable in said casing about an axis, said blades having spanwise slots extending along a major portion of the blade area in communication with the blade interiors, said slots having sides overlapping rearward sufficiently to direct the slot flow substantially along the surface toward the rear edge, means to cause a flow through the slots to energize the boundary layer to provide a high thrust capacity per unit of blade, and a source of power to rotate said blades at given angular velocities to impel the gas through said casing, said blades having pitch angles in a range of values defined by the equations of which $$\beta_1 = \left[\frac{r}{4\pi c}(0.01 + 0.01 t + 0.1 t^2)\right]^{\frac{1}{2}} + \frac{n(c-d)}{2\pi r - nd}$$

determines the lower limit and $$\beta_2 = 1.50 + \frac{n(c-d)}{2\pi r - nd}$$

determines the upper limit, said casing having a ratio of the cross sectional area swept by the rotatable blade to the cross sectional area at the end of the expansion segment equal to or less than $$\frac{A_1}{A_2} = \frac{2\pi v_2}{n c \omega}\left(\frac{p_2}{p_1}\right)^{\frac{1}{1.4}}$$

so that for the pitch angles, angular velocity, velocity of discharge and compression ratio given by the equations the velocity past a rotatable blade is large enough to insure a gap chord ratio greater than unity between said blades to preserve their effectiveness due to energization of the boundary layer in creating a thrust on the impelled fluid.

9. In combination a fluidscrew incorporating a rotatable radial blade extending spanwise from the axis of rotation an axial blade carried on the said radial blade near its end and extending spanwise more along the axis of rotation than transverse thereto, said radial and axial blades having hollow interiors in communication with each other, means to admit fluid to the interior of said radial blade, said axial blade having a perforated upper surface to form an opening directed toward the trailing edge for the discharge of a jet of fluid from said axial blade interior to energize the boundary layer, and means to guide the flow induced externally of and by the rotation of the fluidscrew to the said axial blade for further impulsion.

10. A fluid machine containing a flow of fluid comprising a plurality of sets of curved blades, a casing to conduct fluid from one set of blades to another set, each set serving to alter the local direction of flow and to direct the flow through the machine, one set of blades being rotatable relative to the other set, the blades of at least one set having openings in their surfaces in communication with their interiors and means to admit fluid impelled by one set of blades to the blade interiors of the other set for discharge through their said openings to energize the boundary layer on the surfaces of the blades.

11. A fluid machine incorporating as elements, a blade rotatable about an axis, another blade rotatable about an axis both blades serving to impel a main fluid flow, means to rotate said blades, and a casing to convey fluid impelled by one said blade to said other blade for further impulsion, one of said elements having a wall surface bathed by the pumped fluid curved along the direction of flow so that the flow tends to leave the wall, an opening in said wall surface near the locality of curvature for use in energizing the boundary layer on the surface, one of said blades by its pumping action on the fluid causing a flow through said opening to energize the boundary layer on said wall.

EDWARD A. STALKER.